US012762580B2

(12) United States Patent
Kunwar et al.

(10) Patent No.: US 12,762,580 B2
(45) **Date of Patent: *Oct. 13, 2026**

(54) MACHINE LEARNING (ML)-BASED SYSTEM AND METHOD FOR CUSTOMER SEGMENTATION AND WORKLIST GENERATION

(71) Applicant: HIGHRADIUS CORPORATION, Houston, TX (US)

(72) Inventors: Anupam Kunwar, Hyderabad (IN); Glen George, Hyderabad (IN); Apoorva Shrivastava, Hyderabad (IN); Sayanta Mukherjee, Hyderabad (IN); Shailly Shailja, Hyderabad (IN)

(73) Assignee: HIGHRADIUS CORPORATION

( * ) Notice: Subject to any disclaimer, the term of this patent is extended or adjusted under 35 U.S.C. 154(b) by 186 days.

This patent is subject to a terminal disclaimer.

(21) Appl. No.: 18/306,281

(22) Filed: Apr. 25, 2023

(65) Prior Publication Data

US 2023/0342738 A1 Oct. 26, 2023

Related U.S. Application Data

(60) Provisional application No. 63/334,472, filed on Apr. 25, 2022.

(51) Int. Cl.
*G06Q 30/00* (2023.01)
*G06Q 10/0635* (2023.01)
(Continued)

(52) U.S. Cl.
CPC ..... *G06Q 30/0201* (2013.01); *G06Q 10/0635* (2013.01); *G06Q 20/102* (2013.01);
(Continued)

(58) Field of Classification Search
CPC .................................................. G06Q 30/0201
(Continued)

(56) References Cited

U.S. PATENT DOCUMENTS

2021/0342490 A1* 11/2021 Briancon ................ G06F 21/14
2023/0154222 A1* 5/2023 Desai ................... G06Q 20/102
382/100

OTHER PUBLICATIONS

ProQuestDialogNPL Search History.*

(Continued)

*Primary Examiner* — John H. Holly
(74) *Attorney, Agent, or Firm* — Jason C. Cameron

(57) ABSTRACT

A Machine Learning (ML)-based computing system and method for customer segmentation and collections worklist generation is disclosed. The method includes data receiver module configured to receive one or more open invoices from one or more electronic devices associated with a user. Further, the method includes data processing module configured to process the received one or more open invoices. Further, the method includes segment clustering module configured to determine a payment behaviour and customer risk. Further, the method includes worklist generation module configured to generate a customer worklist. Further, the method includes action recommendation module configured to recommend one or more collection strategies. Further, the method includes prioritization module configured to rank each of the one or more customers in the generated worklist. Furthermore, the method includes the data output module configured to output the one or more collection strategies and the ranked one or more customers.

14 Claims, 7 Drawing Sheets

(51) Int. Cl.
*G06Q 20/10* (2012.01)
*G06Q 30/0201* (2023.01)
*G06Q 30/0204* (2023.01)
*G06Q 30/04* (2012.01)
*G06Q 40/03* (2023.01)

(52) U.S. Cl.
CPC ......... *G06Q 30/0204* (2013.01); *G06Q 30/04* (2013.01); *G06Q 40/03* (2023.01)

(58) Field of Classification Search
USPC ........... 705/40, 1.1, 35, 36 R, 14.17, 38, 30; 707/690, 709
See application file for complete search history.

(56) References Cited

OTHER PUBLICATIONS

Da Costa Rebelo Susana Lopes: "Predicting Account Receivables Outcomes with Machine-Learning", , Jul. 1, 2021 (Jul. 1, 2021), pp. 1-137, XP093170390.*
IP.COM NPL Search History.*

* cited by examiner

MACHINE LEARNING (ML)-BASED SYSTEM AND METHOD FOR CUSTOMER SEGMENTATION AND WORKLIST GENERATION

CROSS-REFERENCES TO RELATED APPLICATIONS

This application claims priority to U.S. Patent Application Ser. No. 63/334,472 filed on Apr. 25, 2022 by HighRadius Corporation entitled, "SYSTEMS AND METHODS FOR DSO IMPACT FACTOR BASED WORKLIST GENERATION AND VISUALIZATION", the disclosure of which is incorporated herein by reference in its entirety for all purposes.

This disclosure references the co-pending U.S. patent application Ser. No. 18/305,483, filed Apr. 24, 2023, filed by HighRadius Corporation entitled, "MACHINE LEARNING (ML)-BASED SYSTEM AND METHOD FOR PREDICTING FINANCIAL TRANSACTION PATTERNS" the disclosure of which is incorporated herein by reference in its entirety for all purposes. The above-listed patent application is relevant to the present invention and provides additional technical information that supports the disclosure contained within this patent application.

FIELD OF INVENTION

Embodiments of the present disclosure relate to Machine Learning (ML)-based system and method for processing financial data. Embodiments further relate to ML-based systems for customer segmentation and collections worklist generation to enforce data driven Collections processes in companies.

BACKGROUND

Predicting financial transaction patterns for accounts receivable is extremely important due to several reasons, such as for cash flow management, invoice management, credit-risk management and determining the collection strategy.

Currently, the number of payment transactions in a financial system is increasing rapidly. Manually collecting payments on open invoices from a customer is a risk task for a collector. A payment behaviour based customer segment analysis is not done across all organizations as a part of the collections process of the open invoices. The conventional process of collecting the open invoices has limited insights. Hence, many times core reasons for gaps between the ideal or Best Possible Days Sales Outstanding (BPDSO) and Actual DSOs are not effectively addressed. At a basic level Past due Amounts, type of customers (Large, Medium, Small), payment methods (check, ACH, Direct Debits), volume of disputes, etc. are used as factors to decide segmentation of customers.

There are also methods where all the past due amounts, type of customers (Large, Medium. Small), payment methods (check, ACH, Direct Debits), volume of disputes factors are assigned a score and based on the cluster of these scores a risk profile is listed to create a customer segment. The created customer segments are then treated to different sets of rules for the collectors to decide on the next steps of the collections process. The conventional methods only employ the highest invoice value first method to ascertain the priority of actions for the collector.

In the conventional methods and systems, a worklist prioritization for the open invoices is not done in an intelligent manner. The conventional methods use minimal insights and foresight to come up with a priority list of the customers. This leads to a lot of wasted manual efforts of the collector's part with no significant improvement in working capital.

Therefore, in order to address the aforementioned issues, there is a need for an improved Machine Learning (ML)-based system and method for processing financial data. Further, there is a need for an ML-based system for customer segmentation and collections worklist generation to enforce data driven Collections processes in companies.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a Machine Learning (ML)-based system and method for processing financial data is disclosed. The ML-based computing system and method includes one or more hardware processors and a memory coupled to the one or more hardware processors. The memory includes a plurality of modules. The plurality of modules includes a data receiver module configured to receive one or more open and closed invoices from one or more electronic devices. The plurality of modules further includes a data processing module configured to process the received one or more open and closed invoices to generate a granularity level instances, granularity level detected pattern, payment pattern consistency score and predicted payment date of one or more open invoices based on a trained Machine Learning (ML) model. The plurality of modules further includes a segment clustering module configured to estimate payment behavior and customer risk for each of the one or more customers based on the generated payment pattern consistency scores, delay propensity factor, current state defining factors of the invoice and customer, contact behavior based features of customer, granularity level detected pattern and predicted payment date. The segment clustering module further configured to segment each of granularity level instances into one or more categories based on the determined payment behavior and the customer risk. The one or more categories comprises payment behaviour based customer segment and risk customer segment. The plurality of modules further includes a worklist generation module configured to generate a customer worklist based on a configured optimization metric and the one or more categories. The plurality of modules further includes an action recommendation module 210 configured to recommend one or more collection strategies for each of the one or more categories based on type of a category, a severity, the configured optimization metric and the generated customer worklist. The plurality of modules further includes a prioritization module configured to rank each of the one or more customers in the generated customer worklist based on at least one of; the one more recommended collection strategies. The plurality of modules further includes a data output module configured to output the one or more collection strategies and the ranked one or more customers on a user interface of one or more electronic devices 102 associated with the user.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
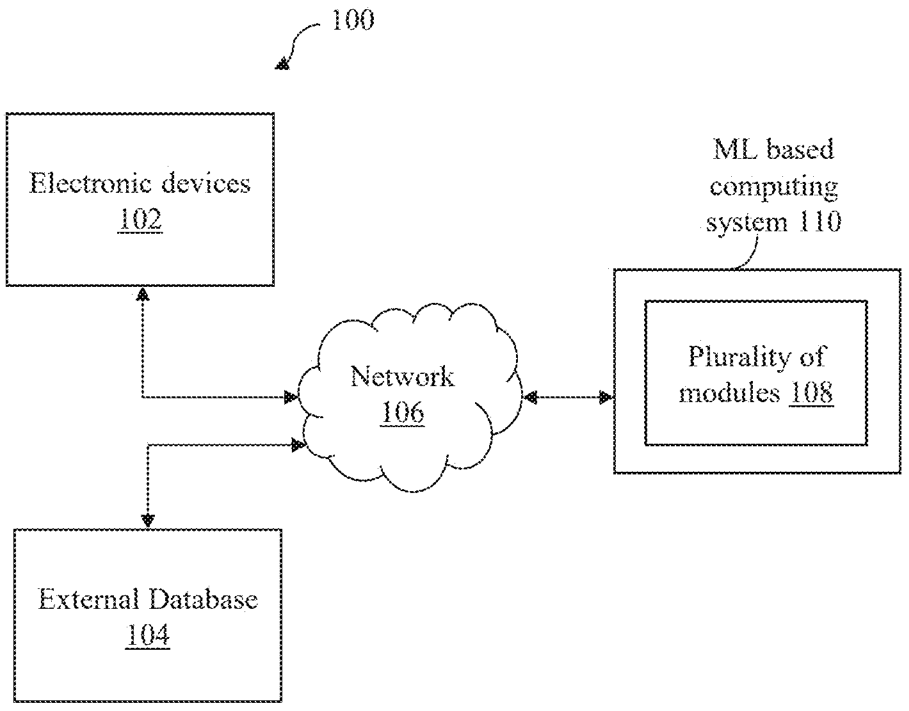
FIG. 1 is a block diagram illustrating an exemplary computing environment for customer segmentation and collections worklist generation, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed and permanently configured (hardwired) or temporarily configured (programmed) to operate in a certain manner and/or to perform certain operations described herein.

Referring now to the drawings, and more particularly to FIG. 1 through FIG. 7, where similar reference characters denote corresponding features consistently throughout the figures, there are shown preferred embodiments and these embodiments are described in the context of the following exemplary system and/or method.

FIG. 1 illustrating an exemplary computing environment 100 for processing financial data, in accordance with an embodiment of the present disclosure. According to FIG. 1, a computing environment 100 includes one or more electronic devices 102 associated with one or more users. The one or more electronic devices 102 are communicatively coupled to a Machine Learning (ML)-based computing system 110 via a network 106. In an exemplary embodiment of the present disclosure, the one or more users may include one or more analysts, business analysts, cash analysts, financial analysts, and the like. Further, the one or more electronic devices 102 are used by the one or more users for sending one or more open and historical closed invoices to the ML-based computing system 110 comprising plurality of modules 108. In an exemplary embodiment of the present disclosure, the one or more electronic devices 102 may also be used by the one or more users to receive the one or more open invoices on the user interface screen of the one or more electronic devices 102. The ML-based computing system 110 may be hosted on a central server, such as cloud server or a remote server. Further, the network 106 may be a Wireless-Fidelity (Wi-Fi) connection, a hotspot connection, a Bluetooth connection, a local area network, a wide area network or any other wireless network. In an exemplary embodiment of the present disclosure, the one or more electronic devices 102 may include a laptop computer, desktop computer, tablet computer, smartphone, wearable device, smart watch, and the like.

Further, the computing environment 100 includes an external database 104 communicatively coupled to the ML-based computing system 110 via the network 106. The external database 104 includes a set of open invoices. The set of open invoices are the invoices for which payment is yet to receive from one or more customers. The one or more open invoices comprises customer number, payment terms, invoice date, baseline date, due date, discount date, clearing date, posting date, invoice type, invoice amount, discount amount, and payment block status.

Furthermore, the one or more electronic devices 102 include a local browser, a mobile application or a combination thereof. Furthermore, the one or more users may use a web application via the local browser, the mobile application or a combination thereof to communicate with the ML-based computing system 110. In an embodiment of the present disclosure, the ML-based computing system 110 includes the plurality of modules 108. Details on the plurality of modules 108 have been elaborated in subsequent paragraphs of the present description with reference to FIG. 2.

Figure 2:
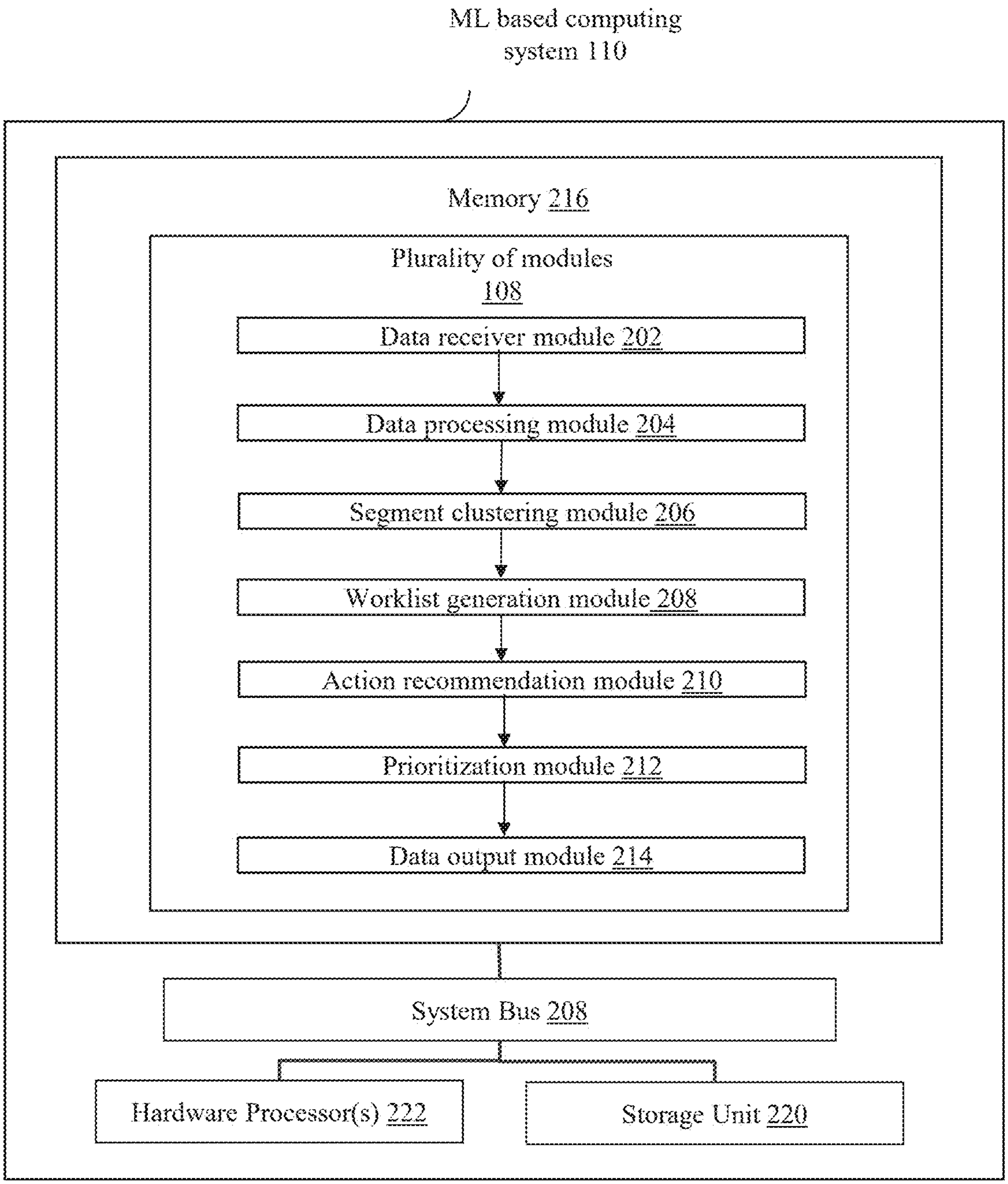
FIG. 2 is a block diagram illustrating an exemplary Machine Learning (ML)-based system for customer segmentation and collections worklist generation, in accordance with an embodiment of the present disclosure.

FIG. 2 is a block diagram illustrating an exemplary Machine Learning (ML)-based computing system 110 for customer segmentation and collections worklist generation, in accordance with an embodiment of the present disclosure. Further, the ML-based computing system 110 includes the plurality of modules 108, a memory 216, a system bus 218, a storage unit 220 and one or more hardware processors 222.

The memory 216 comprises the plurality of modules 108 in the form of programmable instructions executable by the one or more hardware processors 220. Further, the plurality of modules 108 includes a data receiver module 202, a data processor module 204, a Machine Learning based segment clustering module 206, a worklist generation module 208, an action recommendation module 210, a prioritization module 212, and a data output module 214.

The one or more hardware processors 222, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 222 may also include embedded controllers, such as generic or programmable logic devices or arrays, application specific integrated circuits, single-chip computers, and the like.

The memory 216 may be non-transitory volatile memory and non-volatile memory. The memory 216 may be coupled for communication with the one or more hardware processors 222, such as being a computer-readable storage medium. The one or more hardware processors 222 may execute machine-readable instructions and/or source code stored in the memory 216. A variety of machine-readable instructions may be stored in and accessed from the memory 216. The memory 216 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 216 includes the plurality of modules 108 stored in the form of machine-readable instructions on any of the above-mentioned storage media and may be in communication with and executed by the one or more hardware processors 222.

The storage unit 220 may be a cloud storage, or a location on a file system directly accessible by the plurality of modules 108. The storage unit 220 may store the one or more open invoices.

The data receiver module 202 is configured to receive the one or more open invoices and historical closed invoices from the one or more electronic devices 102 associated with the one or more customer. In an exemplary embodiment of the present disclosure, the one or more electronic devices 102 may include a laptop computer or desktop computer, and the like. The one or more open invoices and historical closed invoices are associated with the one or more customers. In an embodiment of the present disclosure, the one or more customers share the one or more open invoices with a collector to close one or more open invoices raised against the one or more customer. In an exemplary embodiment of the present disclosure, the collector may include one or more analysts, business analysts, cash analysts, financial analysts and the like.

In an embodiment of the present disclosure, the one or more open invoices are in one or more formats. For example, the one or more formats include Portable Document Format (PDF), Joint Photographic Expert Group image (JPEG), Portable Network Graphics (PNG), Scalable Vector Graphics (SVG), and Web Picture format (WebP) and the like. In an exemplary embodiment of the present disclosure, the one or more open invoices include handwritten information, machine printed information, and the like.

The data processing module 204 is configured to process the received one or more open invoices to generate a granularity level detected pattern, payment pattern consistency score and predicted payment date of one or more open invoices based on a trained ML model. The granularity level detected patterns comprises payment pattern detect for a set of granularity level instances. The each granularity level instance is a basic logical unit for which the payment transaction pattern is to be determined.

The payment pattern consistency score comprises a value of the payment pattern from 0 to 100%. The one or more customers with a consistency score of greater than 85% is considered as a consistent customer. The one or more customer with a consistency score of less than 85% is considered as an inconsistent customer.

The predicted payment date comprises a set of dates corresponding to open invoices for which one or more customers make the payment.

In an embodiment of the present disclosure, Historical Closed Invoice data is considered as training data. The granularity level configuration is combined with the training data. The combined training data and the granularity level configuration are provided as input to the entity granularity level creation. The entity granularity level creation is configured to create the set of granularity level instances based on a model configuration for a set of granularity levels. The model configuration is used to generate the set of granularity level instances.

The data processing module 204 is configured to extract a set of granularity levels from the received invoice data based on a data density, a volume and a set of data attributes. The set of granularity levels comprises at least one of company code, customer number, payment terms and the like. In an exemplary embodiment, the granularity level is tracked at Company Code or Business Unit Level. In another exemplary embodiment, the granularity level is more granular at Customer of Company Code. or even at Payment Term of a Customer.

In an embodiment of the present disclosure, example is as follows—

If the GRANULARITY LEVEL configuration is set as—
['CompanyCode'. 'CustomerNo', 'PaymentTerm'], GRANULARITY LEVEL
INSTANCES values could be: ["CompanyCode-2300|CustomerNo-1200|PaymentTerm-NET30",
"CompanyCode-2300|CustomerNo-1200|Payment-Term-NET60", . . . ,
"CompanyCode-X|CustomerNo-Y|PaymentTerm-Z"]

In an embodiment of the present disclosure, each of the set of granularity level instances correspond to a basic logical unit for which payment transaction patterns are to be determined. In some embodiments, the data processing module 204 is configured to extract granularity level instances.

The data processing module 204 module extracts a set of granularity levels from the received invoice data based on data density, volume, and the set of data attributes, wherein the set of granularity levels comprises at least one of customer name, company code, customer number payment terms, business unit level, invoice types and the like.

Granularity levels may also comprise a combination of individual granularity levels such as customer name, company code, customer number payment terms, business unit level, invoice types. The granularity level instance creation module further generates a set of granularity level instances based on the extracted set of granularity levels. The each of the set of granularity level instances corresponds to a basic logical unit for which payment transaction pattern is to be determined. For example—If the set of granularity level is extracted as ['company code', 'customer number', payment term']; the set of granularity level instances generated will be ['1200'|'1000'|'NET30'], [1200'|'1000'|'NET60'], ['5600'|'2000'|'NETPROX'], ['1234'|'3000'|'NETDISC'].

The data processing module 204 is configured to compute a payment frequency bucket feature for the created set of granularity level instances. In order to assign the set of Invoices to the set of clusters based on the determined payment frequency bucket features and the data density, the payment frequency computation module executes the following steps. In the first step, the payment frequency computation module is configured to evaluate the relationship between count of payment weeks and due weeks on the historical invoice data with respect to multiple set of look-back periods for all the Granularity Level Instances. In the second step, the payment frequency computation module is configured to classify the granularity level instances into the determined payment frequency bucket features based on the evaluated relationship. The payment frequency bucket feature corresponds to one of: a customer and a vendor to be at least one of: a weekly payer, an alternative week payer, once-a-month payer and a quarterly payer.

In one embodiment, the payment frequency is a measure of the number of distinct payment transactions observed corresponding to an invoice due week. For example: If a customer or vendor makes a payment transaction in one week corresponding to the invoices due in four different weeks, at one go, then the payment transaction is considered to exhibit once-a-month payment frequency bucket feature. Further, each granularity level instance belongs to at least one of the following buckets: a weekly payer, an alternative week payer, once-a-month payer, and a quarterly payer, half-yearly payer, yearly payer and the like. Each granularity instance may further be assigned to a sub-payment frequency bucket such as month-start payer, month-end payer, first Monday of the month payer and the like. Furthermore, the payment frequency bucket feature further assigns the set of closed invoices to a set of clusters based on the determined payment frequency bucket features and the data density.

The data processing module 204 is configured to assign the one or more open invoices to clusters based on the computed payment frequency bucket feature and associated with the data density of the extracted set of granularity levels.

The data processing module 204 is configured to dynamically generate a set of date-shift-payment pattern features based on the determined set of payment frequency bucket features assigned to the set of clusters. The payment pattern generation module generates the set of date-shift-payment-pattern features by shifting a set of invoice level date attributes comprising of at least one of discount date, due date, clearing date and invoice date to a set of reference points on a calendar, based on the determined payment frequency bucket features of the set of clusters. Each of the set of date-shift-payment-pattern features indicates a date on which payment transaction can potentially occur for each of the set of open invoices.

The data processing module 204 provides the examples for the payment pattern of the one or more customers.

Exemplary embodiment of Payment Patterns generated during creation of date-shift-payment-patterns: The payment may happen at the end of the month for the invoices generated before $10^{th}$ day of the month: the payment may happen at the mid of next month for the invoices generated after 10th day of the current month; the payment may happen at the end of the quarter; the payment may happen within 15 days of the invoice creation date The data processing module 204 is configured to select the payment pattern feature with highest probability of adherence for each set of granularity level instances based on the generated payment pattern features. To estimate the probability of adherence, the cumulative error distribution of historical errors is estimated for each of the set of date-shift-payment-pattern features corresponding to each of the set of granularity level instances using the historically closed Invoice data. In order to estimate the cumulative error distribution value of historical errors, the payment pattern selection module is configured to execute the following steps. In the first step, the payment pattern selection module determines an adherence evaluation window for a particular customer. The adherence evaluation window comprises a lower bound value and an upper bound value. For example, adherence_eval_window←[lower_bound, upper_bound]. In the second step, it determines a lookback period for each date-shift-pattern-feature based on the time period of the date-shift-pattern-feature. For example, for a month-end pattern shift feature where all the invoices due in a month get paid at the last day of the month in one-go, will have a lookback which is a multiple of its time period, i.e, 30 days. By the end of the second step, each date-shift-pattern-feature will have a lookback period mapped to it for which cumulative distribution estimation will be done. In the third step, for each date-shift-pattern-feature, Invoices cleared within the lookback period of that feature are filtered, and for the filtered Invoices, cumulative error distribution by revenue is computed for that date shift pattern against the actual clearing date of the Invoices. In the third step, for each date-shift-pattern-feature's cumulative error distribution, the revenue percentage received within the adherence evaluation window (adherence or consistency percentage) is computed.

The cumulative error distribution value corresponds to the revenue concentration levels in the determined adherence evaluation window. Furthermore, In the fourth step, the payment pattern selection module estimates the cumulative error distribution value of the historical errors based on the determined lookback pattern mapping value, by the following steps. In the first step, the payment pattern selection module filters the set of closed invoices based on the lookback period of the lookback pattern mapping value. The set of closed invoices cleared within the lookback period are filtered. In the second step, the payment pattern selection module calculates a gap between clearing date and a pattern date for each of the patterns in the determined lookback pattern mapping value. In the third step, the payment pattern selection module calculates a sum amount and a cumulative sum amount for each calculated gap and the granularity level instance. In the fourth step, the payment pattern selection module estimates the cumulative error distribution value by calculating the revenue percentage at each stage respective to historical revenue of the granularity level instance in the lookback period. In the fifth step, the payment pattern selection module calculates the revenue concentration levels in the determined adherence evaluation window for each of the customers in the estimated cumulative error distribution value. The result of the previous step provides granularity-level-instance revenue consistency for each pattern.

The payment pattern selection module is configured to determine the optimal pattern from the set of date-shift-payment patterns. The optimal pattern corresponds to a pattern with highest probability of adherence for each of the set of granularity level instances. The ML based computing system, predicts a financial transaction completion pattern for the set of open invoices based on the optimal pattern, the set of payment pattern features and the set of granularity level instances by using a financial-transaction-pattern-prediction-based ML model. The financial transaction completion pattern comprises a date for each invoice on which it is likely to get paid, at which the one or more customers and the one or more vendors complete a financial transaction to clear the set of open invoices. Further, the financial transaction completion pattern for the set of open invoices is predicted based on the optimal pattern, the set of payment pattern features and the set of granularity level instances by using the financial-transaction-pattern-prediction-based ML model, which comprises the following steps. In the first step, the date prediction module is configured to apply the determined optimal pattern, the set of payment pattern features and the set of granularity level instances onto the financial-transaction-pattern-prediction-based ML model. In the second step, the date prediction module is configured to map each of the determined optimal patterns, the set of payment pattern features and the set of granularity level instances with the set of open invoices. In the third step, the data prediction module is configured to predict the financial transaction completion pattern for the set of open invoices based on the mapping.

The data processing module 204 is configured to predict a payment date for the one or more open invoices based on the selected payment pattern features. The payment date is predicted for the one or more open invoices based on the detected payment patterns. The detected payment pattern features for the set of granularity level instances facilitates the detectable payment pattern features along with the payment pattern consistency scores.

In some embodiments, the data processing module 204 is explained in the U.S. patent application Ser. No. 18/305,483, filed Apr. 24, 2023, by HighRadius Corporation entitled, "MACHINE LEARNING (ML)-BASED SYSTEM AND METHOD FOR PREDICTING FINANCIAL TRANSACTION PATTERNS" the disclosure of which is incorporated herein by reference in its entirety for all purposes.

The Machine Learning based segment clustering module 206 is configured to determine payment behavior and customer risk for each of the one or more customer based on the generated payment pattern consistency scores, delay propensity factor, current state defining factors of the invoice and customer, contact behavior based features of customer, granularity level detected pattern and predicted payment date. The payment behavior is predicted by a payment pattern detection and date prediction module.

The delay propensity factor is calculated from the due date of the one or more open invoices.

The current state defining factor of the invoice and one or more customer comprises previous payment week of the one or more customer, previous posting week of the one or more customer, current open amount of the one or more customer, total past due amount of the one or more customer, payment frequency factor, skipped invoice flag and disputed flags.

The contact behavior based feature of the one or more customer comprises previous contact date and type, email responses, phone and email preference, number of phone calls and emails in the recent time period.

The Machine Learning based segment clustering module 206 is configured to generate the payment pattern consistency scores for the detected payment pattern features. The Customer Risk is determined based on the Consistency Scores generated by the Payment Pattern Detection and Date Prediction Module, Last Payment Date and the Growing Past Due behavior. The consistency score is a measure of adherence to a granularity-level-instance to a specific pattern. A high consistency score for a granularity-level-instance is reflective of high historical adherence to the predicted pattern.

The Machine Learning based segment clustering module 206 is configured to calculate the delay propensity factor of the selected payment pattern from the due date of the historical closed invoices. The delay propensity factor is computed by using a simple average of the number of days between the predicted pattern and due date of all the historical invoices or by amount based weighted average depending on the configuration.

The Machine Learning based segment clustering module 206 is configured to extract the current state defining factors from the received one or more open invoices. The determined current state defining factors of the invoice and the one or more customer comprises previous payment week of the customer, previous posting week of the customer, current open amount of the customer, total past due amount of the customer, payment frequency factor, skipped invoice flag and disputed flag.

The Machine Learning based segment clustering module 206 is configured to extract the contact behavior based features of the customer. The determined contact behavior based features of the one or more customer comprises contact date and types, email responsiveness, phone and email preference, number of communication in recent time period.

The Machine Learning based segment clustering module 206 is further configured to segment each of the granularity level instances into one or more categories based on the determined payment behavior and the customer risk. The one or more categories comprises payment behaviour based customer segment and risk customer segment. The Segmentation of Customers is done based on the information computed or extracted in the previous steps.

For segmentation various clustering algorithms can be configured, for ex: KMeans Clustering. DBSCAN, etc.

In an alternative embodiment, the ML-based model used for determining payment behavior and customer risk for each of the one or more customers in the Machine Learning based segment clustering module 206 uses a clustering-based ML-model.

In another embodiment, the clustering-based ML-model may include one or more of logistic regression, k-Nearest Neighbours, Support Vector Machines, Kernel SVM, Naïve Bayes model, Decision Tree Classification, Random Forest Classification and the like.

In another embodiment, the clustering-based ML-model may include K-means model, DBSCAN model, HDBSCAN model, k-medoids model and the like.

The K-means model, DBSCAN model, HDBSCAN model, k-medoids model are well-known technologies, and thus detailed description thereof is omitted.

In one embodiment, the K-means model is used for determining payment behavior and customer risk for each customer. K-means works by grouping similar data points into clusters based on their distances from each other. K-means does not require any labels or outcomes for the data. K-means works by randomly choosing k points as the initial cluster centers, where k is the number of clusters specified by the user. Then, it assigns each data point to the nearest cluster center based on some distance measure, such as Euclidean distance. Next, it updates the cluster centers by taking the average of all the data points assigned to each cluster. This process is repeated until the cluster centers do not change significantly or a maximum number of iterations is reached.

In one embodiment, the segment clustering module 206 uses a k-means model to segment customers according to their payment behavior and risk.

The input for the segment clustering module 206 includes one or more of parameters, including generated payment pattern consistency scores, delay propensity factor, current state defining factors of the invoice and customer, contact behavior-based features of customer, granularity level detected pattern and predicted payment date. In one embodiment, the inputs for the segment clustering module 206 is the output of the Data Processing Module 204.

In another embodiment, the data is pre-processed to ensure that it is in a suitable format for input into the K-means model clustering model.

In one non-limiting embodiment, the K-means model is trained using the pre-processed input data to segment customers according to their payment behavior and risk.

The results of the K-means segmentation model are transmitted to the worklist generation module 208 for further processing.

In one embodiment, the DBSCAN model is used for determining payment behavior and customer risk for each customer. DBSCAN is a model in which data points are grouped based on their density, that is, the number of data points in their neighborhood. It is especially useful for datasets that have outliers.

DBSCAN works by defining two parameters: eps and min_samples. Eps is the maximum distance between two data points to be considered as neighbors. Min_samples is the minimum number of data points required to form a dense region. DBSCAN then classifies each data point into one of three types: core, border, or noise. A core point is a point that has at least min_samples points within eps distance. A border point is a point that has fewer than min_samples points within eps distance, but is reachable from a core point. A noise point is a point that is neither a core nor a border point.

DBSCAN then forms clusters by connecting core points that are within eps distance of each other. Border points are assigned to the cluster of their nearest core point. Noise points are not assigned to any cluster. DBSCAN can find clusters of any shape and size, and can also identify outliers as noise points.

In one embodiment, the segment clustering module 206 uses a DBSCAN model to segment customers according to their payment behavior and risk.

The input for the segment clustering module 206 includes one or more of parameters, including generated payment pattern consistency scores, delay propensity factor, current state defining factors of the invoice and customer, contact behavior-based features of customer, granularity level detected pattern and predicted payment date. In one embodiment, the inputs for the segment clustering module 206 is the output of the Data Processing Module 204.

In another embodiment, the data is pre-processed to ensure that it is in a suitable format for input into the DBSCAN model clustering model.

In one non-limiting embodiment, the DBSCAN model is trained using the pre-processed input data to segment customers according to their payment behavior and risk.

The results of the DBSCAN segmentation model are transmitted to the worklist generation module 208 for further processing.

In one embodiment, the HDBSCAN model is used for determining payment behavior and customer risk for each customer. HDBSCAN is a model in which data points are grouped based on their density and hierarchy. It is an extension of DBSCAN that can handle clusters of varying densities and shapes. It is one of the most advanced and robust unsupervised machine learning algorithms for clustering, especially for data that has noise or outliers.

HDBSCAN works by first applying DBSCAN with a very small eps value to obtain a hierarchy of clusters. Then, it uses a technique called cluster stability to extract a flat clustering from the hierarchy. Cluster stability is a measure of how persistent a cluster is over different eps values. The more stable a cluster is, the more likely it is to be a meaningful cluster. HDBSCAN selects the most stable clusters and assigns each data point to one of them or to noise.

HDBSCAN can also provide soft clustering, which represents the degree of membership of each data point to each cluster. This is useful for data that has overlapping or fuzzy clusters. HDBSCAN computes the soft clustering by using the probability of each data point belonging to each cluster at different eps values.

In one embodiment, the segment clustering module 206 uses a HDBSCAN model to segment customers according to their payment behavior and risk.

The input for the segment clustering module 206 includes one or more of parameters, including generated payment pattern consistency scores, delay propensity factor, current state defining factors of the invoice and customer, contact behavior-based features of customer, granularity level detected pattern and predicted payment date. In one embodiment, the inputs for the segment clustering module 206 is the output of the Data Processing Module 204.

In another embodiment, the data is pre-processed to ensure that it is in a suitable format for input into the HDBSCAN model clustering model.

In one non-limiting embodiment, the HDBSCAN model is trained using the pre-processed input data to segment customers according to their payment behavior and risk.

The results of the HDBSCAN segmentation model are transmitted to the worklist generation module 208 for further processing.

In one embodiment, the K-medoids model is used for determining payment behavior and customer risk for each customer. K-medoids is a technique in which we group data points into k clusters based on their similarity to some representative points. It is a variation of k-means clustering that uses actual data points as cluster centers instead of the mean of each cluster. It is also known as the Partitioning Around Medoids (PAM) algorithm.

K-medoids work by randomly choosing k data points as the initial medoids, where k is the number of clusters specified by the user. Then, it assigns each data point to the nearest medoid based on some distance measure, such as Euclidean distance. Next, it updates the medoids by swapping each medoid with a non-medoid data point and computing the total cost of the clustering. The cost is the sum of the distances between each data point and its nearest medoid. The swap that produces the lowest cost is accepted. This process is repeated until no more swaps can lower the cost.

In one embodiment, the segment clustering module 206 uses a k-medoids model to segment customers according to their payment behavior and risk.

The input for the segment clustering module 206 includes one or more of parameters, including generated payment pattern consistency scores, delay propensity factor, current state defining factors of the invoice and customer, contact behavior-based features of customer, granularity level detected pattern and predicted payment date. In one embodiment, the inputs for the segment clustering module 206 is the output of the Data Processing Module 204.

In another embodiment, the data is pre-processed to ensure that it is in a suitable format for input into the K-medoids model clustering model.

In one non-limiting embodiment, the K-medoids model is trained using the pre-processed input data to segment customers according to their payment behavior and risk.

The results of the K-medoids segmentation model are transmitted to the worklist generation module 208 for further processing.

The payment behaviour based customer segment comprises early payers, pays within one week from the due date, pays after one week from the due date and less predictable customers.

The risk customer segment comprises growing past due amounts for the one or more open invoices, uncleared invoices and termination monetary transactions.

The worklist generation module 208 is configured to generate a customer worklist based on a configured optimization metric and the one or more categories. The customer worklist comprises a list of customers and their header and line item level details, sorted in the order of the configured prioritization metric.

The action recommendation module 210 is configured to recommend one or more collection strategies for each of the one or more categories based on type of a category, a severity, the configured optimization metric and the generated customer worklist. The one or more collection strategies comprises one or more actions.

Exemplary embodiments of collection strategy include:

a. Days −5 to −10 before due: Confirm invoice was sent, confirm there are no disputes, and send automated account statement
b. Days 1-7 past due: Contact customer by phone and/or email attempting to secure payment. Ensure any discrepancies or disputes have been resolved.
c. Days 8-14 past due: Send 1st Dunning email and follow up with a professional, scripted phone call. Notify the sales representative that payment is now one week late.
d. Days 15-30 past due: Send 2nd Dunning automated email stating the consequence of the dunning process. Follow up with a phone call to confirm receipt and remind customers of consequence management which could include late fees, interest charges, order blocks, credit revocation, and/or credit hold etc.
e. Days 31-45 past due: Final Dunning with consequence management action taken and informing the customer of the same including late fees and/or credit hold etc.
f. Days 46-60 past due: Begin calling and emailing customers every 3-5 business days
g. Days 61-90 past due: Notify senior management and prepare to send an account to collections agency and/or legal counsel and/or write off as bad debt.

The prioritization module 212 is configured to rank each of the one or more customers in the generated customer worklist based on at least one of: the one more recommended collection strategies. The one or more recommended collection strategies comprises pro-active follow-up, active follow-up and relationship building call.

The data output module 214 is configured to output the one or more collection strategies and the ranked one or more customers on a user interface of the one or more electronic devices 102 associated with the user.

Figure 3:
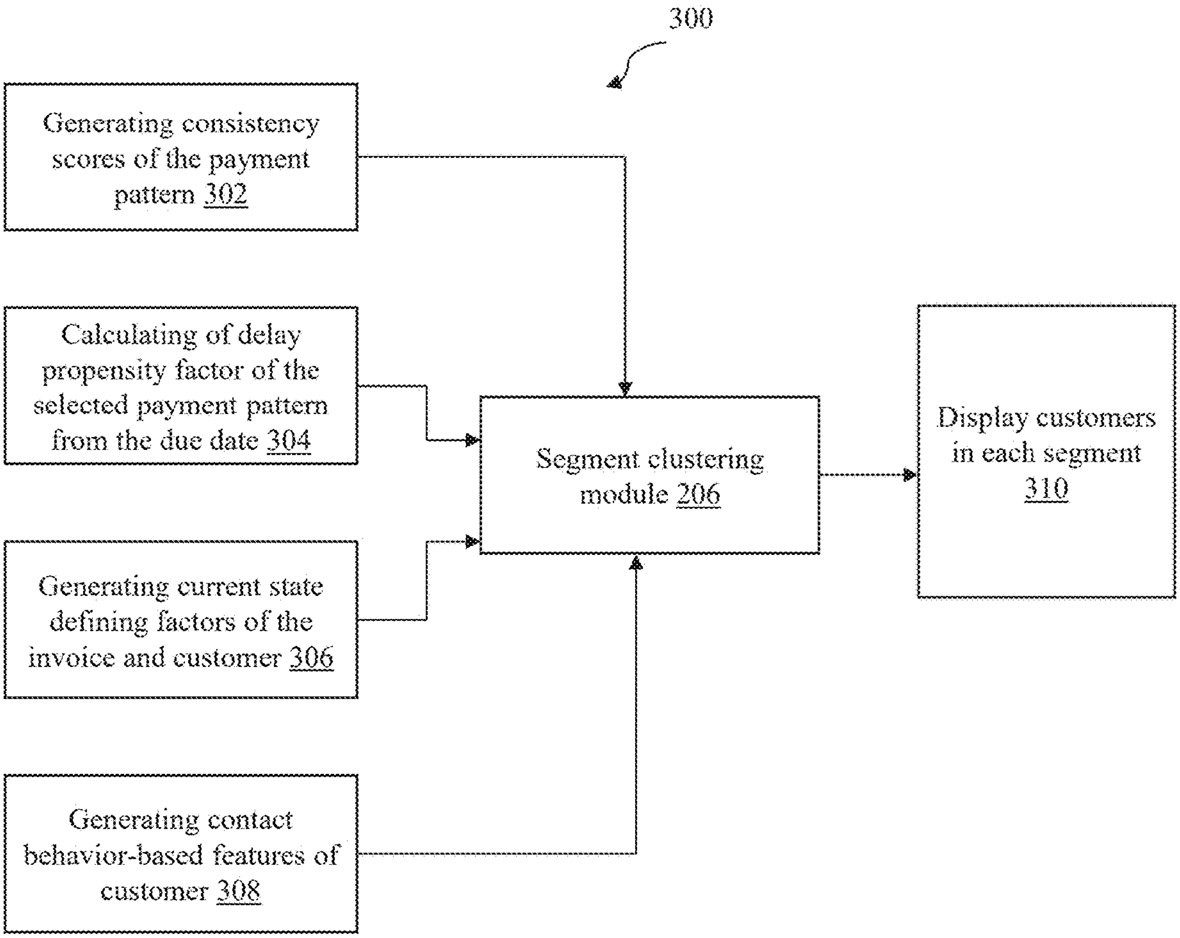
FIG. 3 is a flow chart illustrating an exemplary segmentation process of the one or more open and closed invoices, in accordance with an embodiment of the present disclosure.

FIG. 3 is a flow chart illustrating an exemplary segmentation process 300 of the one or more open invoices, in accordance with an embodiment of the present disclosure.

According to FIG. 3, the Machine Learning based segment clustering module 206 generates the consistency scores of the one or more payment pattern features. Further, the segment clustering module 204 calculates the delay propensity factor of the selected payment pattern from the due date of the one or more open invoices. Further, the segment clustering module 204 generates the current state defining factors of the invoice and customer. The current state defining factors of the invoice and customer are payment week of the customer, posting week of the customer, current open amount of the customer, total past due amount of the customer, payment frequency factor, skipped invoice flag and disputed flag. The Payment Weeks are the weeks corresponding to a customer where the total payment amount has been significant, i.e., greater than 10 percentile of its historical weekly amount distribution. Further, the segment clustering module 204 generates contact behaviour based features of the one or more customers. The contact behaviour based features of the one or more customer includes contact date and type of the one or more customer, phone and email responsiveness of the one or more customer, number of communication in the recent time period. The number of recent time periods includes past 30, 60, 180 days and the like.

The skipped invoice flag determines whether one or more invoices are skipped in the payment process. Furthermore, the disputed flag determines whether the one or more open invoices are under a dispute. The segmented one or more customers are displayed in each customer segment.

In an embodiment of the present disclosure, the segmented one more customer is categorised as payment behaviour based customer segment and risk customer segment. The payment behaviour based customer segments are categorised as early payers, pays within one week from the due date, pays after one week from the due date and less predictable customers. The early payers category comprises the customers who complete the payments for the one or more open invoices before the due date of the one or more open invoices. The customers who pay within one week from the due date comprises the customers who complete the payments within seven days after the due date. The customers pay after one week from the due date category comprises the customers complete the delay of at least seven days after the due date. The less predictable category customers payment pattern and behaviour is categorized as unpredictable. The less predictable customers are identified based on the consistency scores.

Further, the risk customer segment is categorised as customers with growing past due amount of the one or more open invoices, customers with uncleared invoices and termination monetary transactions. The growing past due amount category customers comprises the one or more customers whose total past due amount is increasing. Further, the customer with uncleared invoices category comprises the customers who have an open amount left against and new invoices are posted against the customer. Furthermore, termination monetary transactions category comprises the customers having an open amount left against and no new invoices have either been posted or paid by the customers in a long term.

Figure 4:
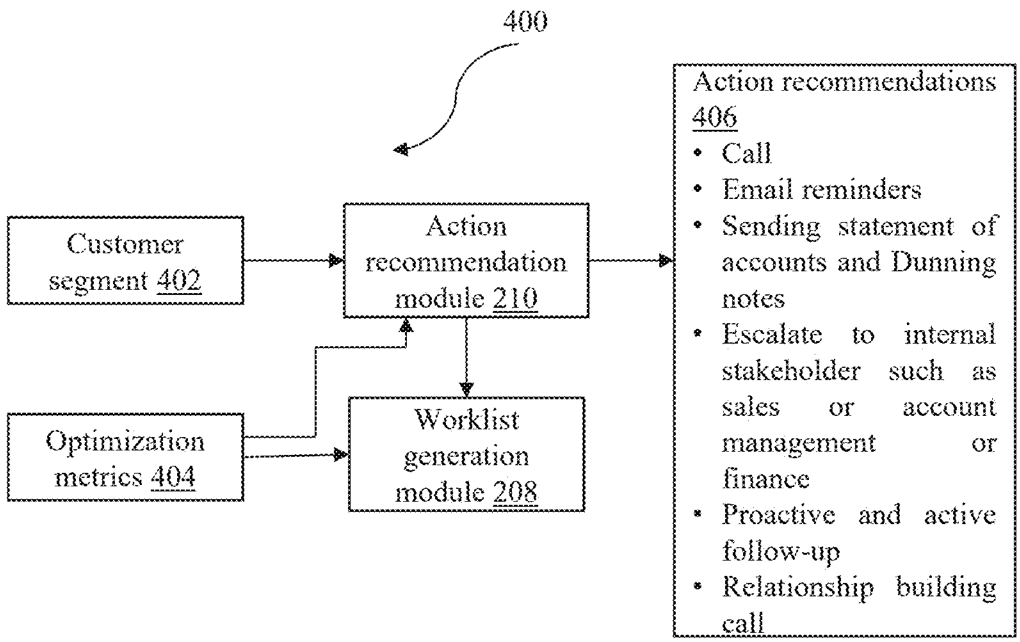
FIG. 4 is a block diagram illustrating an exemplary action generation module, in accordance with an embodiment of the present disclosure.

FIG. 4 is a block diagram illustrating an exemplary action generation module 400, in accordance with an embodiment of the present disclosure.

According to FIG. 4, the action generation module 400 generates the action for the one or more customers to collect the one or more open invoices.

In an embodiment of the present disclosure, the severity of classification, the configured optimization metrics, the one or more actions for the one or more customer are recommended for the collector depending on the classification of the one or more customer based on the segmentation. The recommendation is provided to the collector to take one or more actions for each customer from one or more actions. The one or more action includes call, email reminders, sending statement of accounts and dunning notes, escalation to internal stakeholders including sales and account management finance.

In an embodiment of the present disclosure, the prioritization for the one or more customer segment ranks the one or more customer in the worklist based on at least one of: the one or more recommended collection strategy in an order to promotes high value collections of the one or more open invoices with less effort. The prioritization stage provides custom-prioritization strategies on any entity level. For example, prioritization is done on a customer level open amount, past due amount, a customer level DSO component, collections effort, and the like.

In an embodiment of the present disclosure, the collection of the one or more open invoice is a step-by-step process. The collection of the one or more open invoice will start when an account of the one or more customer becomes due. The collection of the one or more open invoice is needed to continue until the payment is collected from the one or more customers. The collection of the one or more open invoice includes account prioritization of the one or more customers. Further, the collected one or more open invoice provides the one or more instructions to the collector. The one or more instructions include giving clear time frames for contacting the one or more customers, escalating issues to the one or more customer, collection strategy to be used, tone and behaviour which needs to be exhibited throughout the interactions with one or more customers and internal departments. In an embodiment, the examples for the collection strategies are provided in the subsequent paragraphs.

In an embodiment, the first example of the collection strategy of the one or more open invoice includes days −5 to −10 before due. In the example, the collector will get confirmation for one or more open invoices that were sent, confirmation for no disputes of the one or more open invoices, and send an automated account statement to the respective department.

In an embodiment, the second example of the collection strategy of the one or more open invoice includes days 1-7 past due. In the example, the collector contacts one or more customers by phone and/or email attempting to secure payment. Further, the collector ensures discrepancies or disputes have been resolved.

In an embodiment, the third example of the collection strategy of the one or more open invoice includes days 8-14 past due. In the example, the collector sends the first dunning email and follow-up with a professional and scripted phone call to the one or more customers. Further, the collector notifies the sales representative that payment is one week late.

In an embodiment, the fourth example of the collection strategy of the one or more open invoice includes days 15-30 past due. In the example, the collector sends second dunning automated email stating the consequence of the dunning process. Further, the collector follow-up with a phone call to confirm receipt and remind one or more customers of consequence management which includes late fees, interest charges, order blocks, credit revocation, and/or credit hold of the one or more customer.

In an embodiment, the fifth example of the collection strategy of the one or more open invoice includes days 31-45 past due. In the example, the collector sends the final dunning with consequence management action taken and informs the one or more customers of the action taken by the management including late fees and/or credit hold.

In an embodiment, the sixth example of the collection strategy of the one or more open invoice includes days 46-60 past due. In this example, the collector follow-up with one or more customers by phone and/or emailing every 3-5 business days.

In an embodiment, the seventh example of the collection strategy of the one or more open invoice is days 61-90 past due. The collector notifies the management and prepares to send an account to the collection's agency and/or legal counsel and/or write off as bad debt.

Figure 5:
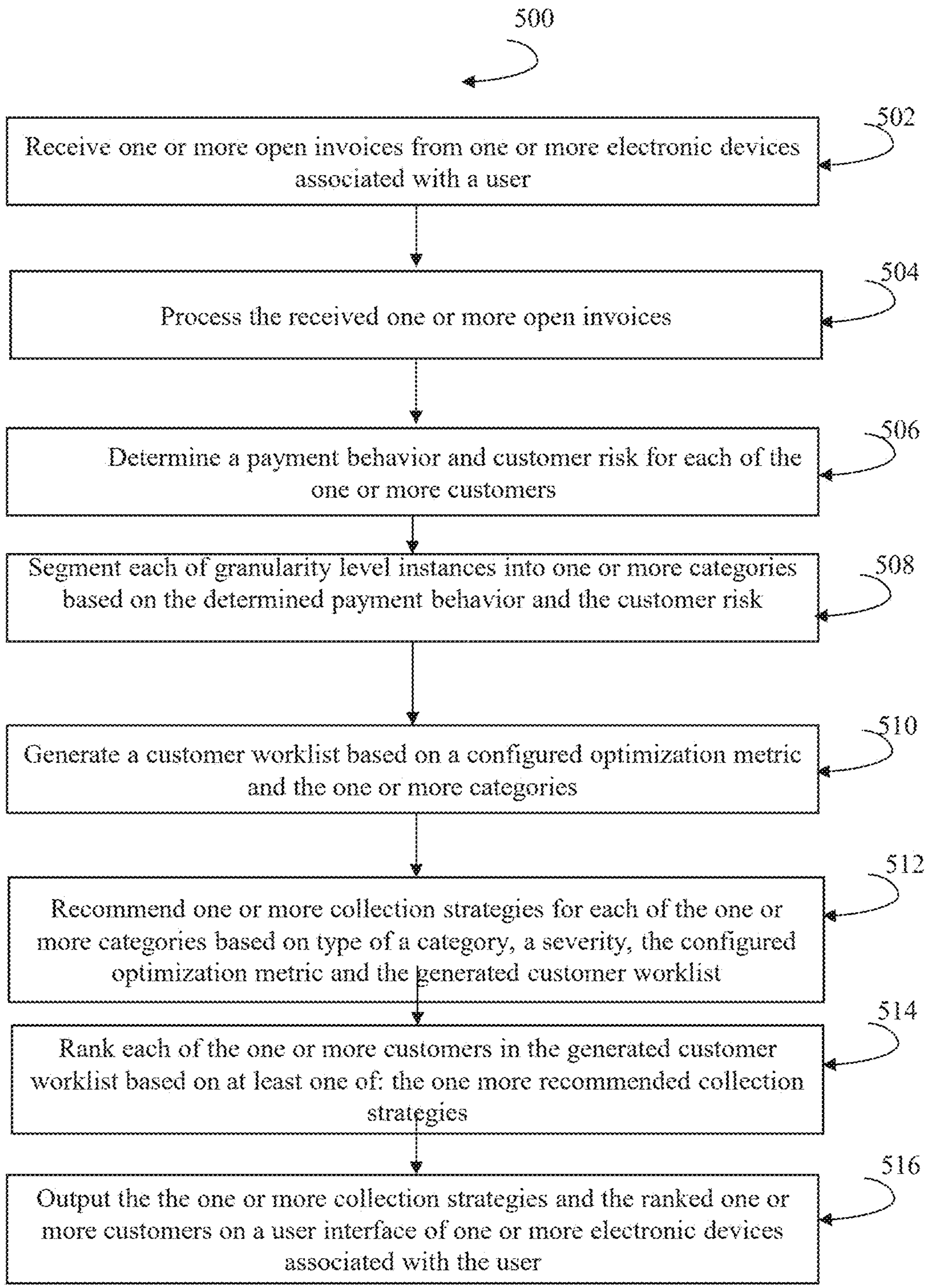
FIG. 5 is a flow chart illustrating an exemplary Machine Learning (ML)-based computing method for customer segmentation and collections worklist generation, in accordance with an embodiment of the present disclosure.

FIG. 5 is a flow chart illustrating an exemplary Machine Learning (ML)-based computing system 500 for facilitating financial transactions, in accordance with an embodiment of the present disclosure.

At step 502, the one or more open invoices are received from the one or more electronic devices 102 associated with the user. The one or more open invoice data comprises customer number, payment terms, invoice date, baseline date, due date, discount date, clearing date, posting date, invoice type, business within the company, invoice amount, discount amount and payment block status.

At step 504, the received one or more open invoices are processed to generate the granularity level instances, granularity level detected pattern, payment pattern consistency score and predicted payment date of one or more open invoices based on a trained Machine Learning (ML) model.

At step 506, the payment behaviour and customer risk for each of the one or more customers are determined based on the generated payment pattern consistency scores, delay propensity factor, current state defining factors of the invoice and customer, contact behavior based features of customer, granularity level detected pattern and predicted payment date.

At step 508, each of the granularity level instances are segmented into the one or more categories based on the determined payment behavior and the customer risk. The one or more categories comprises the payment behavior based customer segment and the risk customer segment.

At step 510, the customer worklist is generated based on the configured optimization metric and the one or more strategies. The configured optimization metric comprises working capital, collecting the payment for the one or more open invoices.

At step 512, the one or more collection strategies are recommended for the each of the one or more categories based on type of a category, a severity, the configured optimization metric and the generated customer worklist. The one or more collection strategies comprises one or more actions.

At step 514, each of the one or more customers are ranked in the generated customer worklist based on at least one of the one or more recommended collection strategies.

At step 516, the one or more collection strategies are outputted and ranked one or more customers on the user interface of the one or more electronic device 102 associated with the user.

The method 500 generates a summary view of the payment behaviour based customer segment.

The method 500 further includes generating a drill-down view of the worklist collection of the customer segment.

Figure 6:
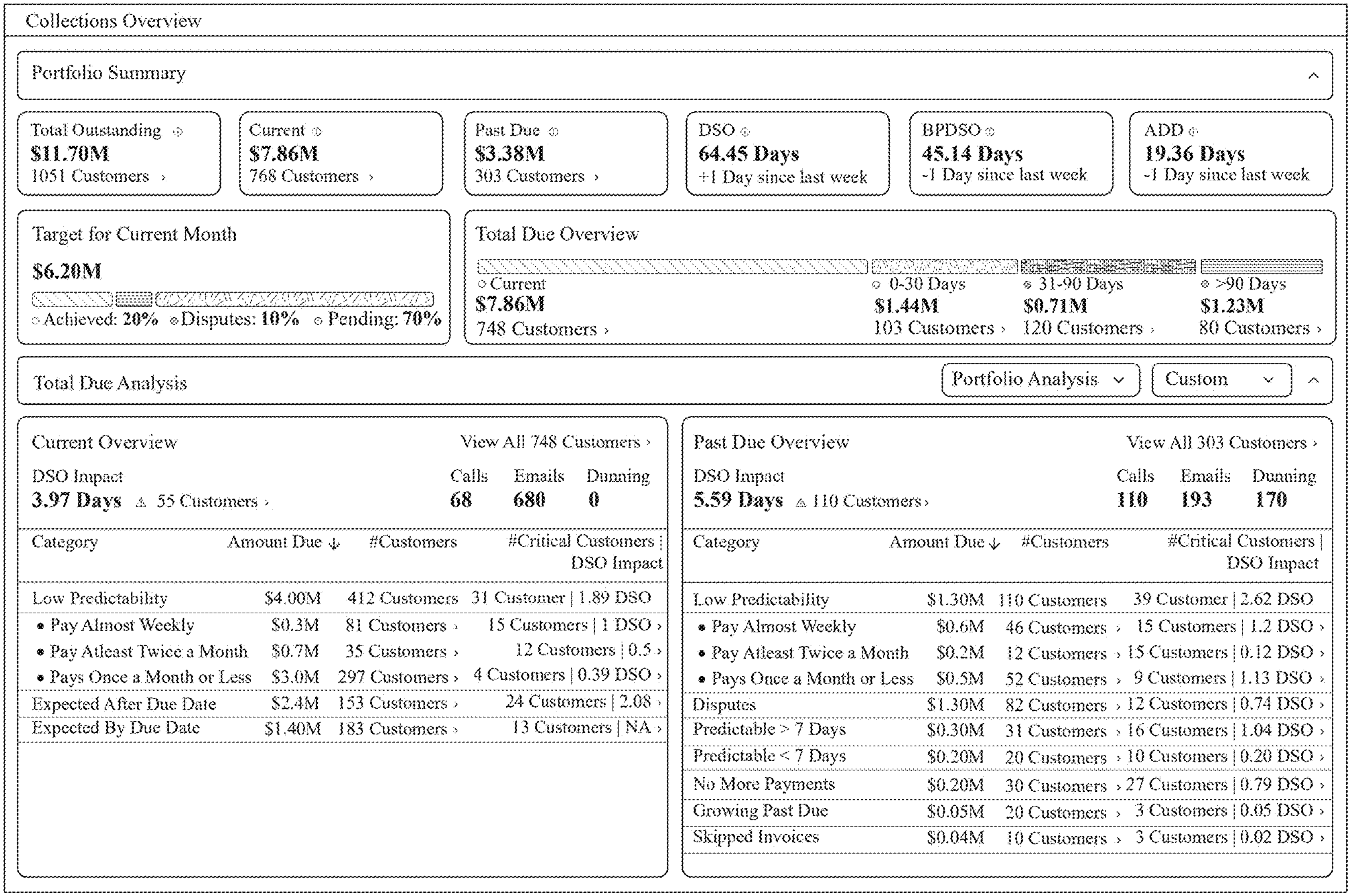
FIG. 6 is an exemplary graphical representation of summary view of customer segment, in accordance with an embodiment of the present disclosure.

FIG. 6 is an exemplary graphical representation of summary view of customer segment, in accordance with an embodiment of the present disclosure.

According to FIG. 6, the prioritization module 212 generates the summary view of the payment behaviour based customer segment. The summary view of each payment behaviour based customer segment comprises total outstanding amount, current amount, past due amount, Days Sale Outstanding (DSO), BPDSO, target for current month, total due overview, total due analysis and DSO impacts. Further, the collector checks the respective set of the one or more customers on the basis count, DSO impact or category. Furthermore, the one or more action is performed automatically for the non-critical customers FIG. 7 is an exemplary graphical representation of drill-down view of collection worklist report of customer segment, in accordance with an embodiment of the present disclosure.

Figure 7:
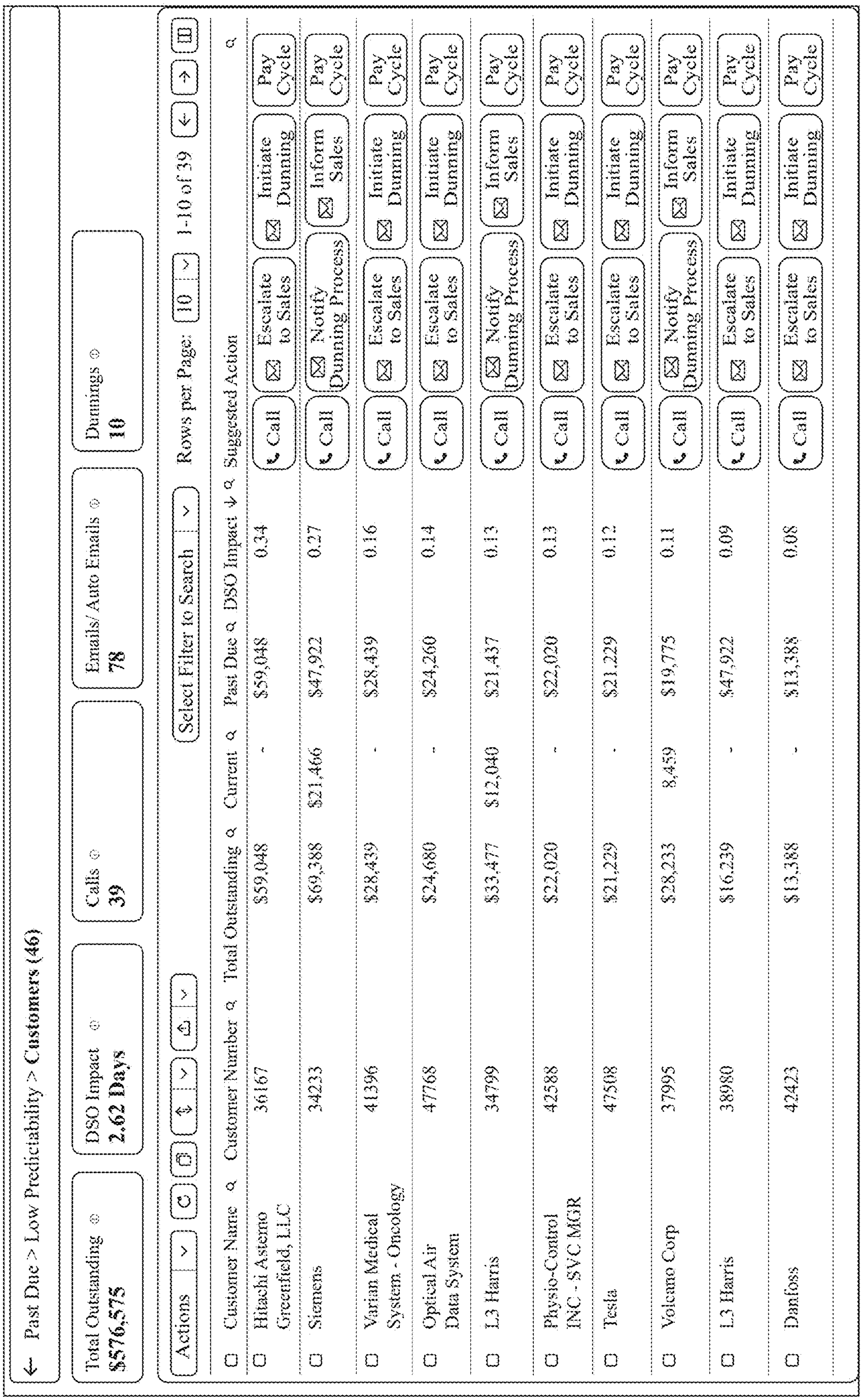
FIG. 7 is an exemplary graphical representation of drill-down view of collection worklist report of customer segment, in accordance with an embodiment of the present disclosure.

According to FIG. 7, the drilldown view of the worklist collection includes the suggested actions for the one more customer is assigned automatically at the one or more customer level based on the overall status of the one or more customer. Further, different actions are available and assigned to the one or more customer based on the one or more open invoices. Furthermore, the collector performs the suggested one or more actions to collect the one or more open invoices from the one or more customer.

In certain embodiments, the invention provides a method for dynamically updating the ML based computing system and re-train the system. The method comprises: monitoring the performance of the machine learning model in real time: identifying instances where the performance of the ML-based computing system falls below a predetermined threshold; automatically generating new training data based on the identified instances; and retraining the machine learning model using the new training data.

As the ML based computing system is retrained, the system becomes more proficient in customer segmentation and collections worklist generation. This results in significant benefits for both the processing hardware (e.g., servers) and the overall decision-making process. The continuous improvement in accuracy and efficiency, facilitated by the ongoing updates to the machine learning model, leads to tangible gains in performance. This not only optimizes the use of processing hardware but also reduces the number of incorrect predictions. By streamlining the system in this manner, the invention provides a more robust and reliable solution for customer segmentation and collections worklist generation.

In an embodiment of the present disclosure, the present method presents holistic view to management and collections teams with multiple well recognized metrics that impact working capital and are easy to understand. Further, the present method provides dynamic segmentation possible in which conventional approaches are static rule based and driven by business segment categorization, but the present approach dynamically adapts to change in payment behaviour and accordingly comes up with the segmentation. Further, the present method allows distinctive collections approaches to be applied on different segments of the customers depending upon nature and severity of the customer segment and enables context sensitive organizational customization based on staffing, established collection strategies and consequence management. Further, the present method provides better identification of key pain points and appropriate action recommendations 406 promote efficient collections processes. Furthermore, the present method adapts the change in the payment behaviours and highlights the potential risks in advance.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening 1/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus 218 to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A Machine Learning (ML)-based computing method for customer segmentation and collections worklist generation, the ML-based computing method comprising:

receiving, by one or more hardware processors, one or more open invoices from one or more electronic devices associated with a user, wherein the invoice data comprises customer number, payment terms, invoice date, baseline date, due date, discount date, clearing date, posting date, invoice type, transactions within a company, invoice amount, discount amount and payment block status;

processing, by the one or more hardware processors, the received one or more open invoices to generate granularity level instances, granularity level detected pattern, payment pattern consistency score and predicted payment date of one or more open invoices based on a trained ML model, wherein processing the received one or more open invoices comprises:

determining, by the one or more hardware processors, an adherence evaluation window and a look-back period for each date-shift-payment-pattern feature corresponding to each set of granularity level instances based on historically closed invoice data;

estimating, by the one or more hardware processors, a cumulative error distribution of historical deviations between predicted and actual clearing dates of invoices within the look-back period;

determining, by the one or more hardware processors, from the cumulative error distribution, a revenue concentration level within the adherence evaluation window; and identifying, by the one or more hardware processors, the date-shift-payment-pattern feature having the highest probability of adherence as an optimal payment pattern feature based on the determined revenue concentration level;

predicting, by the one or more hardware processors, a financial transaction completion pattern for the set of open invoices based on the optimal payment pattern feature, the set of date-shift-payment-pattern features and the set of granularity level instances by using a financial transaction pattern prediction based ML model; and predicting, by the one or more hardware processors, the payment date for the one or more open invoices and the payment pattern consistency scores based on the optimal payment pattern features and the financial transaction completion pattern;

determining, by the one or more hardware processors, a payment behavior and customer risk for each of the one or more customers using a clustering based ML model, wherein the clustering based ML model groups similar data points associated with the generated payment pattern consistency scores, delay propensity factor, current state defining factors of the invoice and customer, contact behavior based features of customer, granularity level detected pattern and predicted payment date into clusters based on at least one of: distances between each of the data points, density of the data points, hierarchy of the clusters, and similarity to one or more representative points, wherein the clustering based ML model comprises at least one of: a K-means model, DBSCAN model, HDBSCAN model and K-medoids model, and wherein the clustering based ML model is automatically selected for datasets having at least one of: outliers and varying cluster densities to enable at least one of: a noise-resistant and hierarchy-based clustering;

segmenting, by the one or more hardware processors, each of the granularity level instances dynamically into one or more categories based on the determined payment behavior and the customer risk using the clustering based ML model, wherein the one or more categories comprises payment behaviour based customer segment and risk customer segment;

generating, by the one or more hardware processors, a customer worklist based on a configured optimization metric and the one or more categories, wherein the configured optimization metric comprises working capital, collecting the payment for the one or more open invoices;

recommending, by the one or more hardware processors, one or more collection strategies for each of the one or more categories based on type of a category, a severity, the configured optimization metric and the generated customer worklist, wherein the one or more collection strategies comprises one or more actions;

ranking, by the one or more hardware processors, each of the one or more customers in the generated customer worklist based on the one or more recommended collection strategies;

dynamically updating and retraining, by the one or more hardware processors, the trained ML model by:

monitoring performance of the trained ML model in real time;

identifying instances where performance of the ML-based computing system falls below a predetermined threshold;

automatically generating new training data based on the identified instances;

retraining the trained ML model using the newly generated training data; and outputting, by the one or more hardware processors, the one or more collection strategies and the ranked one or more customers on a user interface of one or more electronic devices associated with the user.

2. The ML-based computing method of in claim 1, wherein processing the received one or more open invoices to generate the granularity level detected pattern, payment pattern consistency score and predicted payment date of the one or more open invoices based on the trained ML model, the method comprising:

extracting a set of granularity levels from the received invoice data based on data density, volume and the set of data attributes, wherein the set of granularity levels comprises at least one of company code, customer number and payment terms;

generating a set of granularity level instances based on the extracted set of granularity levels, wherein each of the set of granularity level instances corresponds to a basic logical unit for which payment transaction pattern is to be determined;

creating the generated set of granularity level instances based on a model configuration for granularity levels, wherein the model configuration is used to generate the set of granularity level instances;

computing a payment frequency bucket feature for the created set of granularity level instances;

assigning the one or more open invoices to clusters based on the computed payment frequency bucket feature and associated with the data density of the extracted set of granularity levels; and generating the payment pattern features by shifting invoice level data attributes to plurality of reference points on a calendar based on the computed payment frequency bucket feature of the cluster.

3. The ML-based computing method of claim 1, wherein determining the payment behavior and customer risk for each of the one or more customers based on the payment pattern consistency scores, the delay propensity factor, current state defining factors of the invoice and customer, contact behavior based features of the customer, granularity level detected pattern and predicted payment date, the method comprising:

generating the payment pattern consistency scores for the detected payment pattern features;

calculating the delay propensity factor of the selected payment pattern from a due date of the one or more open invoices;

extracting the current state defining factors from the received one or more open invoices, wherein the determined current state defining factors of the invoice and customer comprise previous payment week of the customer, previous posting week of the customer, current open amount of the customer, total post due amount of the customer, payment frequency factor, skipped invoice flag and disputed flag; and extracting the contact behavior based features of the customer, wherein the determined contact behavior based features of the customer comprises contact date and types, email responsiveness, phone and email preference, number of communication in recent time period.

4. The ML-based computing method of claim 1, wherein the payment behaviour based customer segment comprises early payers, pays within one week from the due date, pays after one week from the due date and less predictable customers and wherein the risk customer segment comprises growing past due amount, uncleared invoices and termination of monetary transactions.

5. The ML-based computing method of claim 1, wherein the one or more actions comprises proactive follow-up, active follow-up and relationship building call, email reminder, sending statement of account, dunning notices and escalate to internal stakeholders.

6. The ML-based computing method of claim 1, wherein ranking each of the one or more customers in the generated customer worklist based on at least one of: the one or more recommended collection strategies, the method comprising:

generating a summary view of the payment behaviour based customer segment, wherein the summary view of the each payment behaviour based customer segment comprises total outstanding amount, current amount, past due amount, Days Sale Outstanding (DSO), BPDSO, target for current month, total due overview, total due analysis and DSO impacts.

7. A Machine Learning (ML)-based computing system for processing of open invoices for the customers, the ML-based computing system comprising:

one or more hardware processors; and a memory coupled to the one or more hardware processors, wherein the memory comprises a plurality of modules in the form of programmable instructions executable by the one or more hardware processors, and wherein the plurality of modules comprises:

a data receiver module configured to receive one or more open invoices from one or more electronic devices associated with a user, wherein the invoice data comprises customer number, payment terms, invoice date, baseline date, due date, discount date, clearing date, posting date, invoice type, transactions within a company, invoice amount, discount amount and payment block status;

a data processing module configured to process the received one or more open invoices to generate granularity level instances, granularity level detected pattern, payment pattern consistency score and predicted payment date of one or more open invoices based on a trained ML model, wherein to process the received one or more open invoices, a payment pattern selection module is configured to:

determine an adherence evaluation window and a look-back period for each date-shift-payment-pattern feature corresponding to each set of granularity level instances based on historically closed invoice data;

estimate a cumulative error distribution of historical deviations between predicted and actual clearing dates of invoices within the look-back period;

determine, from the cumulative error distribution, a revenue concentration level within the adherence evaluation window; and identify the date-shift-payment-pattern feature having the highest probability of adherence as an optimal payment pattern feature based on the determined revenue concentration level;

a data prediction module configured to:

predict a financial transaction completion pattern for the set of open invoices based on the optimal payment pattern feature, the set of date-shift-payment-pattern features and the set of granularity level instances by using a financial transaction pattern prediction-based ML model;

predict the payment date for the one or more open invoices and the payment pattern consistency scores based on the optimal payment pattern features and the financial transaction completion pattern;

a segment clustering module configured to:

determine a payment behavior and customer risk for each of the one or more customers using a clustering based ML model, wherein the clustering based ML model groups similar data points associated with the generated payment pattern consistency scores, delay propensity factor, current state defining factors of the invoice and customer, contact behavior based features of customer, granularity level detected pattern and predicted payment date into clusters based on at least one of: distances between each of the data points, density of the data points, hierarchy of the clusters, and similarity to one or more representative points, and wherein the clustering based ML model comprises at least one of: a K-means model, DBSCAN model, HDBSCAN model and K-medoids model, and wherein the clustering based ML model is automatically selected for datasets having at least one of: outliers and varying cluster densities to enable at least one of: a noise-resistant and hierarchy-based clustering;

segment each of the granularity level instances dynamically into one or more categories based on the determined payment behavior and the customer risk using the clustering based ML model, wherein the one or more categories comprises payment behaviour based segment and high risk segments;

a worklist generation module configured to generate a customer worklist based on a configured optimization metric and the one or more categories, wherein the configured optimization metric comprises working capital, collecting the payment for the one or more open invoices;

an action recommendation module configured to recommend one or more collection strategies for each of the one or more categories based on type of a category, a severity, and the configured optimization metric, wherein the one or more collection strategies comprises one or more actions;

a prioritization module configured to rank each of the one or more customers in the generated customer worklist based on at least one of: the one or more recommended collection strategies;

wherein the ML-based computing system is configured to:

monitor performance of the trained ML model in real time;

identify instances where performance of the ML-based computing system falls below a predetermined threshold;

automatically generate new training data based on the identified instances; and retrain the trained ML model using the newly generated training data;

a data output module configured to output the one or more collection strategies and the ranked one or more customers on a user interface of one or more electronic devices associated with the user.

8. The ML-based computing system of claim 7, wherein to process the received one or more open invoices to generate the granularity level detected pattern, payment pattern consistency score and predicted payment date of the one or more open invoices based on the trained ML model, the data processing module is configured to:

extract a set of granularity levels from the received invoice data based on data density, volume and the set of data attributes, wherein the set of granularity levels comprises at least one of company code, customer number and payment terms;

generate a set of granularity level instances based on the extracted set of granularity levels, wherein each of the set of granularity level instances corresponds to a basic logical unit for which payment transaction pattern is to be determined;

create the generated set of granularity level instances based on a model configuration for granularity levels, wherein the model configuration is used to generate the set of granularity level instances;

compute a payment frequency bucket feature for the created set of granularity level instances;

assign the one or more open invoices to clusters based on the computed payment frequency bucket feature and associated with the data density of the extracted set of granularity levels;

generate the payment pattern features by shifting invoice level data attributes to plurality of reference points on a calendar based on the computed payment frequency bucket feature of the cluster;

select the payment pattern feature with highest probability of adherence for each set of granularity level instances based on the generated payment pattern features; and predict a payment date for the one or more open invoices based on the selected payment pattern features, wherein the payment date is predicted for the one or more open invoices based on the detected payment patterns, wherein the detected payment pattern features for the set of granularity level instances facilitates the detectable payment pattern features along with the payment pattern consistency scores.

9. The ML-based computing system of claim 7, wherein to determine the payment behavior and customer risk for each of the one or more customers based on the payment pattern consistency scores, the delay propensity factor, current state defining factors of the invoice and customer, contact behavior based features of the customer, granularity level detected pattern and predicted payment date, the segment clustering module comprising:

generate the payment pattern consistency scores for the detected payment pattern features;

calculate the delay propensity factor of the selected payment pattern from a due date of the one or more open invoices;

extract the current state defining factors from the received one or more open invoices, wherein the determined current state defining factors of the invoice and customer comprise previous payment week of the customer, previous posting week of the customer, current open amount of the customer, total post due amount of the customer, payment frequency factor, skipped invoice flag and disputed flag; and extract the contact behavior based features of the customer, wherein the determined contact behavior based features of the customer comprises contact date and types, email responsiveness, phone and email preference, number of communication in recent time period.

10. The ML-based computing system of claim 7, wherein the payment behaviour based customer segment comprises early payers, pays within one week from the due date, pays after one week from the due date and less predictable customers and wherein the risk customer segment comprises growing past due amount, uncleared invoices and termination of monetary transactions.

11. The ML-based computing system of claim 7, wherein the one or more actions comprises proactive follow-up, active follow-up and relationship building call, email reminder, sending statement of account, dunning notices and escalate to internal stakeholders.

12. The ML-based computing system of claim 7, wherein in rank each of the one or more customers in the generated customer worklist based on at least one of: the one or more recommended collection strategies, the prioritization module is configured to:

generate a summary view of the payment behaviour based customer segment, wherein the summary view of the each payment behaviour based customer segment comprises total outstanding amount, current amount, past due amount, Days Sale Outstanding (DSO), BPDSO, target for current month, total due overview, total due analysis and DSO impacts.

13. A non-transitory computer-readable storage medium having instructions stored therein that, when executed by a hardware processor, cause the processor to perform method steps comprising:

receiving one or more open invoices from one or more electronic devices associated with a user, wherein the invoice data comprises customer number, payment terms, invoice date, baseline date, due date, discount date, clearing date, posting date, invoice type, transactions within a company, invoice amount, discount amount and payment block status;

processing the received one or more open invoices to generate granularity level instances, granularity level detected pattern, payment pattern consistency score and predicted payment date of one or more open invoices based on a trained ML model, wherein processing the received one or more open invoices comprises:

determining, by the one or more hardware processors, an adherence evaluation window and a look-back period for each date-shift-payment-pattern feature corresponding to each set of granularity level instances based on historically closed invoice data;

estimating, by the one or more hardware processors, a cumulative error distribution of historical deviations between predicted and actual clearing dates of invoices within the look-back period;

determining, by the one or more hardware processors, from the cumulative error distribution, a revenue concentration level within the adherence evaluation window; and identifying, by the one or more hardware processors, the date-shift-payment-pattern feature having the highest probability of adherence as an optimal payment pattern feature based on the determined revenue concentration level;

predicting, by the one or more hardware processors, a financial transaction completion pattern for the set of open invoices based on the optimal payment pattern feature, the set of date-shift-payment-pattern features and the set of granularity level instances by using a financial transaction pattern prediction based ML model; and predicting, by the one or more hardware processors, the payment date for the one or more open invoices and the payment pattern consistency scores based on the optimal payment pattern features and the financial transaction completion pattern;

determining a payment behavior and customer risk for each of the one or more customers using a clustering based ML model, wherein the clustering based ML model groups similar data points associated with the generated payment pattern consistency scores, delay propensity factor, current state defining factors of the invoice and customer, contact behavior based features of customer, granularity level detected pattern and predicted payment date into clusters based on at least one of: distances between each of the data points, density of the data points, hierarchy of the clusters, and similarity to one or more representative points, and wherein the clustering based ML model comprises at least one of: a K-means model, DBSCAN model, HDBSCAN model and K-medoids model, and wherein the clustering based ML model is automatically selected for datasets having at least one of: outliers and varying cluster densities to enable at least one of: a noise-resistant and hierarchy-based clustering;

segmenting each of the granularity level instances dynamically into one or more categories based on the determined payment behavior and the customer risk using the clustering based ML model, wherein the one or more categories comprises payment behaviour based customer segment and risk customer segment;

generating a customer worklist based on a configured optimization metric and the one or more categories, wherein the configured optimization metric comprises working capital, collecting the payment for the one or more open invoices;

recommending one or more collection strategies for each of the one or more categories based on type of a category, a severity, the configured optimization metric and the generated customer worklist, wherein the one or more collection strategies comprises one or more actions;

ranking each of the one or more customers in the generated customer worklist based on at least one of: the one or more recommended collection strategies;

dynamically updating and retraining, by the one or more hardware processors, the trained ML model by:

monitoring performance of the trained ML model in real time, identifying instances where performance of the ML-based computing system falls below a predetermined threshold;

automatically generating new training data based on the identified instances and retraining the trained ML model using the new training data; and outputting the one or more collection strategies and the ranked one or more customers on a user interface of one or more electronic devices associated with the user.

14. The non-transitory computer-readable storage medium of claim 13, further comprising instructions to cause the processor to perform:

extracting a set of granularity levels from the received invoice data based on data density, volume and the set of data attributes, wherein the set of granularity levels comprises at least one of company code, customer number and payment terms;

generating a set of granularity level instances based on the extracted set of granularity levels, wherein each of the set of granularity level instances corresponds to a basic logical unit for which payment transaction pattern is to be determined;

creating the generated set of granularity level instances based on a model configuration for granularity levels, wherein the model configuration is used to generate the set of granularity level instances;

computing a payment frequency bucket feature for the created set of granularity level instances;

assigning the one or more open invoices to clusters based on the computed payment frequency bucket feature and associated with the data density of the extracted set of granularity levels;

generating the payment pattern features by shifting invoice level data attributes to plurality of reference points on a calendar based on the computed payment frequency bucket feature of the cluster;

selecting the payment pattern feature with highest probability of adherence for each set of granularity level instances based on the generated payment pattern features; and predicting a payment date for the one or more open invoices based on the selected payment pattern features, wherein the payment date is predicted for the one or more open invoices based on the detected payment patterns, wherein the detected payment pattern features for the set of granularity level instances facilitates the detectable payment pattern features along with the payment pattern consistency scores.

* * * * *